United States Patent [19]

Otsuka et al.

[11] 4,380,988

[45] Apr. 26, 1983

[54] AIR/FUEL RATIO CONTROL SYSTEM FOR INTERNAL COMBUSTION ENGINES, HAVING EXHAUST GAS RECIRCULATION CONTROL FUNCTION

[75] Inventors: Kazuo Otsuka, Higashikurume; Shin Narasaka, Yono; Shumpei Hasegawa, Niiza, all of Japan

[73] Assignee: Honda Giken Kogyo Kabushiki Kaisha, Tokyo, Japan

[21] Appl. No.: 295,750

[22] Filed: Aug. 24, 1981

[30] Foreign Application Priority Data

Aug. 28, 1980 [JP] Japan ................................ 55-119114

[51] Int. Cl.³ .......................................... F02M 25/06
[52] U.S. Cl. ................................................... 123/571
[58] Field of Search ........................................ 123/571

[56] References Cited

U.S. PATENT DOCUMENTS

| | | | |
|---|---|---|---|
| 4,040,394 | 8/1977 | Wahl et al. | 123/571 X |
| 4,071,003 | 1/1978 | Aono | 123/571 |
| 4,100,891 | 7/1978 | Williams | 123/571 X |
| 4,164,206 | 8/1979 | Toelle | 123/571 |
| 4,166,437 | 9/1979 | Biancai et al. | 123/571 X |
| 4,173,205 | 11/1979 | Toelle | 123/571 |
| 4,190,029 | 2/1980 | Taplin | 123/571 |

*Primary Examiner*—Wendell E. Burns
*Attorney, Agent, or Firm*—Lyon & Lyon

[57] ABSTRACT

An air/fuel ratio control system for performing feedback control of the air/fuel ratio of an air/fuel mixture being supplied to an internal combustion engine. The air/fuel ratio control system is provided with an exhaust gas recirculation system which is adapted to use a pressure sensor and a temperature sensor for detection of conditions of interruption of the exhaust gas recirculation at low engine load and at low engine temperature. At the same time, the above sensors are used for detection of various engine operating conditions for control of the air/fuel ratio of the mixture, and are adapted to produce outputs continuously variable with wide ranges of changes in the absolute pressure in the intake system of the engine and in the engine temperature. The exhaust gas recirculation system thus precludes the use of special sensors and therefore has a simple exhaust gas recirculation control section.

2 Claims, 3 Drawing Figures

AIR/FUEL RATIO CONTROL SYSTEM FOR INTERNAL COMBUSTION ENGINES, HAVING EXHAUST GAS RECIRCULATION CONTROL FUNCTION

BACKGROUND OF THE INVENTION

This invention relates to an air/fuel ratio control system for performing feedback control of the air/fuel ratio of an air/fuel mixture being supplied to an internal combustion engine, and more particularly to such a system which is adapted to automatically close exhaust gas recirculation valve (EGR valve) which returns exhaust gases from the exhaust system of the engine to the intake system, to cause interruption of the exhaust gas recirculation at low engine load or at low engine temperature during air/fuel ratio control operation, to thereby prevent incomplete combustion within engine cylinders.

An air/fuel ratio control system has been proposed by the assignee of the present application, which is adapted to perform feedback control of the air/fuel ratio of an air/fuel mixture being supplied to an internal combustion engine having an intake system and an exhaust system, and which comprises means for detecting the concentration of an exhaust gas ingredient emitted from the engine, fuel quantity adjusting means for producing the mixture being supplied to the engine, and an electrical circuit operatively connecting the concentration detecting means with the fuel quantity adjusting means in a manner effecting feedback control operation to control the air/fuel ratio of the mixture to a predetermined value in response to an output signal produced by the concentration detecting means.

An exhaust gas recirculation system (EGR system) is already known, which is provided at the exhaust passage of the engine to introduce exhaust gases as inert gases into the intake passage of the engine for mixture with the suction mixture so as to cause a drop in the maximum combustion temperature within the engine cylinders and accordingly a reduction in the amount of NOx to be present in the exhaust gases. When this exhaust gas recirculation is effected by means of such exhaust gas recirculation system, there can occur incomplete combustion within engine cylinders during low load operation of the engine such as idle and deceleration and during low temperature operation of the engine. Therefore, a conventional system of this kind is adapted to have its exhaust gas recirculation operation interrupted during such engine operations. To determine such engine operating conditions for interruption of the exhaust gas recirculation, the conventional system is provided with a specially made pressure sensor having an atmospheric pressure-compensating bellows for detecting the low load condition of the engine, as well as a specially made thermosensor for detecting the low load condition of the engine.

OBJECT AND SUMMARY OF THE INVENTION

It is the object of the invention to provide an air/fuel ratio control system which is adapted to use an intake system-pressure sensor and an engine coolant temperature sensor for detection of the low load and low temperature conditions of the engine as well, which sensors are originally intended to detect particular engine operating conditions such as wide-open-throttle and deceleration, and the timing of initiation of the air/fuel ratio control. The air/fuel ratio control system is capable of automatically interrupting and resuming the exhaust gas recirculation in response to detected value signals outputted from these sensors in an accurate manner, and has a simplified construction.

According to the invention, there is provided an air/fuel ratio control system for performing feedback control of the air/fuel ratio of an air/fuel mixture being supplied to an internal combustion engine having an intake system, an exhaust system, and a throttle valve arranged within the intake system, which comprises in combination: means for detecting the concentration of an exhaust gas ingredient emitted from the engine; fuel quantity adjusting means for producing the mixture being supplied to the engine; and an electrical circuit operatively connecting the concentration detecting means with the fuel quantity adjusting means in a manner effecting feedback control operation to control the air/fuel ratio of the mixture to a predetermined value in response to an output signal produced by the concentration detecting means; an exhaust gas recirculation passage communicating the intake system with the exhaust system; an exhaust gas recirculation valve arranged across the exhaust gas recirculation passage and having means actuatable by negative pressure to open the valve; a port opening in the intake system of the engine at a location slightly upstream of the throttle valve in idle position; a negative pressure passage communicating the port with the exhaust gas recirculation valve; a solenoid valve arranged to close the negative pressure passage; an absolute pressure sensor adapted to produce an output signal continuously variable with a change in absolute pressure present in the intake system; an engine temperature sensor adapted to produce an output signal continuously variable with a change in engine coolant temperature; and a circuit provided within the electrical circuit for detecting an operating condition of the engine and electrically connected to the solenoid valve. The electrical circuit is operable on the outputs of the absolute pressure sensor and the engine temperature sensor, which are supplied to the engine operating condition detecting circuit, to carry out control of the air/fuel ratio of the mixture. The electrical circuit is also operable on the same outputs to cause the solenoid valve to close the negative pressure passage and simultaneously introduce atmospheric air into the negative pressure-actuatable means of the exhaust gas recirculation valve when the absolute pressure output has a value lower than a predetermined value or the engine coolant temperature output has a value lower than a predetermined value.

The above and other objects, features and advantages of the invention will be more apparent from the ensuing detailed description taken in connection with the accompanying drawings in which:

DETAILED DESCRIPTION

Details of the air/fuel ratio control system according to the invention will now be described with reference to the accompanying drawings in which an embodiment of the invention is illustrated.

Figure 1:
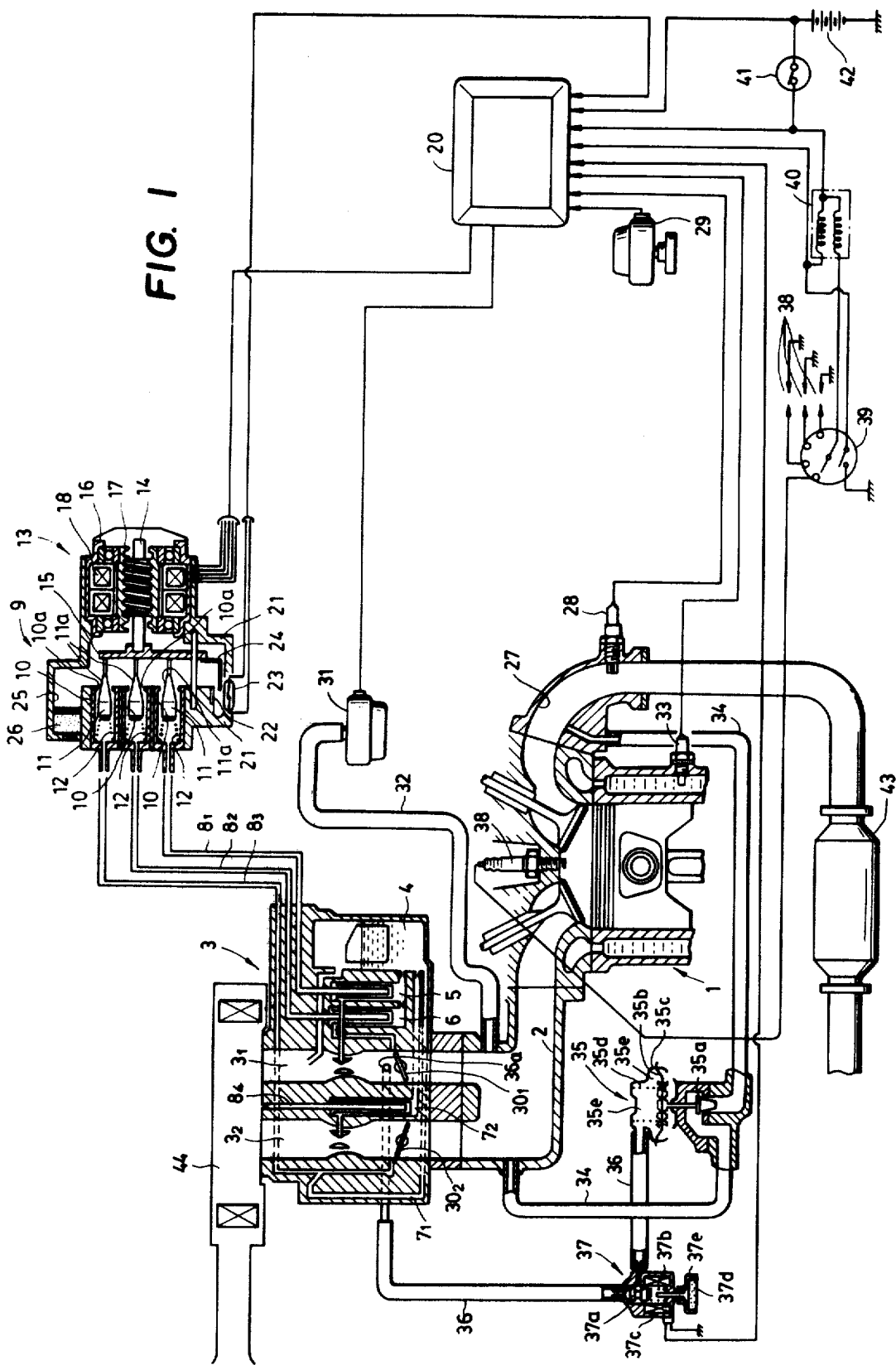
FIG. 1 is a diagrammatic view illustrating the whole arrangement of an air/fuel ratio control system according to the invention.

Referring first to FIG. 1, there is illustrated the whole system of the invention. Reference numeral 1 designates an internal combustion engine. Connected to the engine 1 is an intake manifold 2 which is provided with a carburetor generally designated by the numeral 3. The carburetor 3 has fuel passages 5, 6 which communicate a float chamber 4 with the primary bore $3_1$ of the carburetor 3. These fuel passages 5, 6 are connected to an air/fuel ratio control valve generally designated by the numeral 9, via air bleed passages $8_1$, $8_2$. The carburetor 3 also has fuel passages $7_1$, $7_2$ communicating the float chamber 4 with the secondary bore $3_2$ of the carburetor 3. The fuel passage $7_1$, on one hand, is connected to the above air/fuel ratio control valve 9 via an air passage $8_3$ and, on the other hand, opens in the secondary bore $3_2$ at a location slightly upstream of a throttle valve $30_2$ in the secondary bore. The fuel passage $7_2$ communicates with the interior of an air cleaner 44 via an air passage $8_4$ having a fixed orifice. The control valve 9 is comprised of three flow rate control valves, each of which is formed of a cylinder 10, a valve body 11 displaceably inserted into the cylinder 10, and a coil spring 12 interposed between the cylinder 10 and the valve body 11 for urging the valve body 11 in a predetermined direction. Each valve body 11 is tapered along its end portion 11a remote from the coil spring 12 so that the effective opening area of the opening 10a of each cylinder 10, in which the tapered portion 11a of the valve body is inserted, varies as the valve body 11 is moved. Each valve body 11 is disposed in urging contact with a connection plate 15 coupled to a worm element 14 which is axially movable but not rotatable about its own axis. The worm element 14 is in threaded engagement with the rotor 17 of a pulse motor 13 which is arranged about the element 14 and rotatably supported by radial bearings 16. Arranged about the rotor 17 is a solenoid 18 which is electrically connected to an electronic control unit (hereinafter called "ECU") 20. The solenoid 18 is energized by driving pulses supplied from ECU 20 to cause rotation of the rotor 17 which in turn causes movement of the worm element 14 threadedly engaging the rotor 17 in the leftward and rightward directions as viewed in FIG. 1. Accordingly, the connection plate 15 coupled to the worm element 14 is moved leftward and rightward in unison with the movement of the worm element 14.

The pulse motor 13 has its stationary housing 21 provided with a permanent magnet 22 and a reed switch 23 arranged opposite to each other. The plate 15 is provided at its peripheral edge with a magnetic shielding plate 24 formed of a magnetic material which is interposed between the permanent magnet 22 and the reed switch 23 for movement into and out of the gap between the two members 22, 23. The magnetic shielding plate 24 is displaced in the leftward and rightward directions in unison with displacement of the plate 15 in the corresponding directions. The reed switch 23 turns on or off in response to the displacement of the plate 24. That is, when the valve body 11 of the air/fuel ratio control valve 9 passes a reference position which is determined by the positions of the permanent magnet 22, reed switch 23 and magnetic shielding plate 24, the reed switch 23 turns on or off depending upon the moving direction of the valve body 11, to supply a corresponding binary output signal to ECU 20.

Incidentally, the pulse motor housing 21 is formed with an air intake 25 communicating with the atmosphere. Air is introduced through a filter 26 mounted in the air intake 25, into each flow rate control valve in the housing 21.

On the other hand, an $O_2$ sensor 28, which is made of zirconium oxide or the like, is inserted in the inner peripheral wall of the exhaust manifold 27 of the engine 1 in a manner partly projecting into the manifold 27. The sensor 28 is connected to ECU 20 to supply its output thereto. An atmospheric pressure sensor 29 is provided to detect the ambient atmospheric pressure surrounding the vehicle, not shown, in which the engine 1 is installed. The sensor 29 is also connected to ECU 20 to supply its output thereto.

A pressure sensor (absolute pressure sensor) 31 is connected to the intake manifold 2 leading to the engine 1 by way of a conduit 32 having its one end opening in the manifold 2 at a location downstream of the throttle valve $30_1$, to detect the absolute pressure present in the intake manifold 2. This pressure sensor 31 may be formed of a bellows displaceable in response to pressure and a potentiometer or a semiconductor strain gauge coupled to the bellows for displacement therewith. This type sensor is adapted to produce an output variable with a change in the internal resistance of its component semiconductor or its component resistor. The variable resistance element such as the semiconductor or the resistor has its internal resistance variable in a continuous manner as the absolute pressure in the intake manifold 2 varies. As mentioned later, the electrical circuit provided within ECU 20 converts this continuous change in the internal resistance of the variable resistance element into a corresponding continuous change in electric voltage to determine the absolute pressure. The pressure sensor 31 is used to determine the fulfillment of conditions of open loop control at wide-open-throttle and deceleration of the engine, as well as the fulfillment of conditions of closure of an exhaust gas recirculation valve at low engine load operation, as described hereinlater. To answer these various purposes, the pressure sensor 31 is adapted to produce an output varying in a continuous manner over a wide range in response to changes in the absolute pressure in the intake manifold 2 over a wide range. Therefore, by using this pressure sensor 31, it is possible to provide a plurality of different predetermined absolute pressure values for comparison with the actual absolute pressure for the purpose of determining the above-mentioned various conditions. The pressure sensor 31 has its output electrically connected to ECU 20 to supply thereto an output signal indicative of a detected value of the absolute pressure.

A thermistor 33 is inserted in the peripheral wall of an engine cylinder, the interior of which is filled with engine cooling water used as engine coolant, to detect the temperature of the cooling water as the engine temperature. The thermistor 33 is also electrically connected to ECU 20 to supply thereto its output signal indicative of a detected temperature value. The thermistor 33 has a negative temperature coefficient. That is, its internal resistance continuously decreases as its temperature increases. The electrical circuit within ECU 20 converts a continuous change in the internal resistance of the thermistor 33, which corresponds to a change in the temperature of the cooling water, into a corresponding continuous change in electric voltage to detect the cooling water temperature. This thermistor 33 is used to determine the fulfillment of a condition of initiation of air/fuel ratio control, conditions of closure of the exhaust gas recirculation valve at low engine temperature operation, etc. Therefore, the temperature sensor composed of the thermistor 33 is adapted to produce an output variable in a continuous manner over a wide range in response to changes in the temperature over a wide range. Like the pressure sensor 31, the temperature sensor also makes it possible to provide a plurality of different predetermined engine temperature values for comparison with the actual engine temperature for the purpose of determining the above-mentioned conditions.

A conduit 34 is provided as an exhaust gas recirculation passage which communicates the exhaust manifold 27 of the engine 1 with the intake manifold 2. An exhaust gas recirculation valve (EGR valve) 35 is arranged across the conduit 34 to selectively close and open it.

This exhaust gas recirculation valve 35 is a negative pressure-responsive type and comprises a valve body 35a secured to a diaphragm 35b for closing and opening the conduit 34 in response to displacement of the diaphragm 35b. The diaphragm 35b is mounted in a bridging manner in a casing 35c which is connected to an end of a conduit 36 communicating with a negative pressure intake port 36a opening in the primary bore $3_1$ at a location slightly upstream of the throttle valve $30_1$ in the idle position (fully closed position). The diaphragm 35b is urged by a spring 35d in the direction of closing the conduit 34 through the valve body 35a. The diaphragm 35b and the casing 35c cooperate together to form negative pressure-actuatable means having a negative pressure chamber 35e defined therein. More specifically, the diaphragm 35b is displaced to cause the valve body 35a to open the conduit 34 against the force of the spring 35d when negative pressure produced at the negative pressure intake port 36a is introduced into the negative pressure chamber 35e. On the other hand, when a control valve 37, described hereinlater, operates to interrupt the introduction of negative pressure into the chamber 35e and instead simultaneously allow atmospheric pressure to be introduced thereinto, the diaphragm 35b is displaced in the opposite direction by the force of the spring 35d to cause the valve body 35a to close the conduit 34. As well known, this exhaust gas recirculation valve 35 acts to introduce part of exhaust gases as inert gases into the suction mixture to lower the maximum combustion temperature within the engine cylinders for reduction in the amount of NOx in the exhaust gases. However, if this exhaust gas recirculation is effected at low engine load operation such as engine idle and engine deceleration, or at low engine temperature operation, it can cause incomplete combustion within the engine cylinders. Therefore, an EGR control valve 37, which is formed of a solenoid valve, is provided in order to interrupt the supply of negative pressure to the valve 35 and simultaneously allow introduction of atmospheric air into the valve 35 to close it during the above engine operations. This valve 37 is comprised of a valve body 37a arranged to close the conduit 36, a spring 37b urging the valve body 37a in the valve closing direction, a solenoid 37c arranged to be energized by a control signal from ECU 20 to cause displacement of the valve body 37a in the valve opening direction, and an air intake port 37e provided with a filter 37d and arranged for communication with the conduit 36 leading to the EGR valve 35 when the valve 37 is closed. Detection of a low engine load condition is made by detecting the absolute pressure in the intake manifold 2 by means of the pressure sensor 31, which also takes part in the air/fuel ratio control as described later, and which detects the absolute pressure through the conduit 32 opening in the intake manifold 2. A detected value signal is supplied from the sensor 31 to ECU 20. ECU 20 compares the value of this signal with a predetermined value previously stored therein. As long as the former value is lower than the latter value, ECU 20 keeps the solenoid valve 37 at its closed position where transmission of negative pressure to the diaphragm 35b is interrupted. When the former value exceeds the latter value, ECU 20 changes the value 37 into its open position where negative pressure can be transmitted to the diaphragm 35b.

Incidentally, in FIG. 1, reference numeral 38 designates an ignition plug, 39 a distributor, 40 an ignition coil, 41 an ignition switch, 42 a battery, and 43 a three-way catalyst for purifying HC, CO and NOx in the exhaust gases, respectively. The distributor 39 has a drive shaft, not shown, which is arranged for rotation at speeds proportional to the engine rpm, so that electric current is supplied from the ignition coil 40 to ECU 20, which corresponds in frequency to switching of the contact breaker of the distributor 39 which is in synchronism with the rotation of the drive shaft, or an output signal of a contactless pickup alternatively provided. Thus, in the illustrated embodiment, the distributor 39 and the ignition coil 40 also act as the engine rpm sensor.

Details of the air/fuel ratio control which can be performed by the air/fuel ratio feedback control system of the invention outlined above will now be described with reference to FIG. 1 which has been referred to hereinabove.

INITIALIZATION

Referring first to the initialization, when the ignition switch 41 in FIG. 1 is set on at the start of the engine, ECU 20 is initialized to detect the reference position of the actuator or pulse motor 13 by means of the reed switch 23 and hence drive the pulse motor 13 to set it to its best position (a preset position) for starting the engine, that is, set the initial air/fuel ratio to a predetermined proper value. The above preset position of the pulse motor 13 is hereinafter called "$PS_{CR}$". This setting of the initial air/fuel ratio is made on condition that the engine rpm Ne is lower than a predetermined value $N_{CR}$ (e.g., 400 rpm) and the engine is in a condition before firing. The predetermined value $N_{CR}$ is set at a value higher than the cranking rpm and lower than the idling rpm.

The above reference position of the pulse motor 13 is detected as the position at which the read switch 23 turns on or off, as previously mentioned with reference to FIG. 1.

Then, ECU 20 monitors the condition of activation of the O₂ sensor 28 and the coolant temperature Tw detected by the thermistor 33 to determine whether or not the engine is in a condition for initiation of the air/fuel ratio control. For accurate air/fuel ratio feedback control, it is a requisite that the $O_2$ sensor 28 is fully activated and the engine is in a warmed-up condition. The $O_2$ sensor 28, which is made of stabilized zirconium dioxide or the like, has a characteristic that its internal resistance decreases as its temperature increases. If the $O_2$ sensor is supplied with electric current through a resistance having a suitable resistance value from a constant-voltage regulated power supply provided within ECU 20, the electrical potential or output voltage of the sensor initially shows a value close to the power supply voltage (e.g., 5 volts) when the sensor is not activated, and then, its electrical potential lowers with the increase of its temperature. Therefore, according to the invention, the air/fuel ratio feedback control is not initiated until after the conditions are fulfilled that the sensor produces an activation signal when its output voltage lowers down to a predetermined voltage Vx, a timer finishes counting for a predetermined period of time $t_x$ (e.g., 1 minute) starting from the occurrence of the above activation signal, and the coolant temperature Tw increases up to a predetermined value Twx at which the automatic choke is opened to an opening for enabling the air/fuel ratio feedback control.

During the above stage of the detection of activation of the $O_2$ sensor and the coolant temperature Tw, the pulse motor 13 is held at its predetermined position $PS_{CR}$. The pulse motor 13 is driven to appropriate positions in response to the operating condition of the engine after initiation of the air/fuel ratio control, as hereinlater described.

BASIC AIR/FUEL RATIO CONTROL

Following the initialization, the program proceeds to the basic air/fuel ratio control.

ECU 20 is responsive to various detected value signals representing the output voltage of the $O_2$ sensor 28, the absolute pressure in the intake manifold 2 detected by the pressure sensor 31, the engine rpm Ne detected by the rpm sensor 39, 40, and the atmospheric pressure $P_A$ detected by the atmospheric pressure sensor 29, to drive the pulse motor 13 as a function of these signals to control the air/fuel ratio. More specifically, the basic air/fuel ratio control comprises open loop control which is carried out at wide-open-throttle, at engine idle, and at engine deceleration, and closed loop control which is carried out at engine partial load. All the control is initiated after completion of the warming-up of the engine.

First, the condition of open loop control at wide-open-throttle is met when the differential pressure $P_A - P_B$ (gauge pressure) between the absolute pressure $P_B$ detected by the pressure sensor 31 and the atmospheric pressure $P_A$ (absolute pressure) detected by the atmospheric pressure sensor 29 is lower than a predetermined value $\Delta P_{WOT}$. ECU 20 compares the difference in value between the output signals of the sensors 29, 31 with the predetermined value $\Delta P_{WOT}$ stored therein, and when the relationship of $P_A - P_B < \Delta P_{WOT}$ stands, drives the pulse motor 13 to a predetermined position (preset position) $PS_{WOT}$ and holds it there, which is a position best appropriate for the engine emissions to be obtained at the time of termination of the wide-open-throttle open loop control. At wide-open-throttle, a known economizer, not shown, or the like is actuated to supply a rich or small air/fuel ratio mixture to the engine.

The condition of open loop control at engine idle is met when the engine rpm Ne is lower than a predetermined idle rpm $N_{IDL}$ (e.g., 1,000 rpm). ECU 20 compares the output signal value Ne of the rpm sensor 39, 40 with the predetermined rpm $N_{IDL}$ stored therein, and when the relationship of $Ne < N_{IDL}$ stands, drives the pulse motor 13 to a predetermined idle position (preset position) $PS_{IDL}$ which is best suitable for the engine emissions and holds it there.

The above predetermined idle rpm $N_{IDL}$ is set at a value slightly higher than the actual idle rpm to which the engine concerned is adjusted.

The condition of open loop control at engine deceleration is fulfilled when the absolute pressure $P_B$ in the intake manifold is lower than a predetermined value $PB_{DEC}$. ECU 20 compares the output signal value $P_B$ of the pressure sensor 31 with the predetermined value $PB_{DEC}$ stored therein, and when the relationship of $P_B < PB_{DEC}$ stands, drives the pulse motor 13 to a predetermined deceleration position (preset position) $PS_{DEC}$ best suitable for the engine emissions and holds it there.

The ground for this condition of open loop control at engine deceleration lies in that when the absolute pressure $P_B$ in the intake manifold drops below the predetermined value, unburned HC is produced at an increased rate in the exhaust gases, to make it impossible to carry out the air/fuel ratio feedback control based upon the detected value signal of the $O_2$ sensor with accuracy, thus failing to control the air/fuel ratio to a theoretical value. Therefore, according to the invention, the open loop control is employed, as noted above, when the absolute pressure $P_B$ in the intake manifold detected by the pressure sensor 31 is smaller than the predetermined value $PB_{DEC}$, where the pulse motor is set to the predetermined position $PS_{DEC}$ best suitable for the engine emissions obtained at the time of termination of the deceleration open loop control. At the beginning of engine deceleration, a shot air valve, not shown, is actuated to supply air into the intake manifold to prevent the occurrence of unburned ingredients in the exhaust gases.

During operations of the above-mentioned open loop control at wide-open-throttle, at engine idle, at engine deceleration, the respective predetermined positions $PS_{WOT}$, $PS_{IDL}$, $PS_{DEC}$ for the pulse motor 13 are compensated for atmospheric pressure $P_A$, as hereinlater described.

On the other hand, the condition of closed loop control at engine partial load is met when the engine is in an operating condition other than the above-mentioned open loop control conditions. During the closed loop control, ECU 20 performs selectively feedback control based upon proportional term correction (hereinafter called "P term control") and feedback control based upon integral term correction (hereinafter called "I term control"), in response to the engine rpm Ne detected by the engine rpm sensor 39, 40 and the output signal of the $O_2$ sensor 28.

To be concrete, the integral term correction is used when the output voltage of the $O_2$ sensor 28 varies only at the higher level side or only at the lower level side with respect to a reference voltage Vref, wherein the position of the pulse motor 13 is corrected by an integral value obtained by integrating the value of a binary signal which changes in dependence on whether the output voltage of the $O_2$ sensor is at the higher level or at the lower level with respect to the predetermined reference voltage Vref, to thereby achieve stable and accurate position control of the pulse motor 13. On the other hand, when the output signal of the $O_2$ sensor changes from the higher level to the lower level or vice versa, the proportional term correction is carried out wherein the position of the pulse motor 13 is corrected by a value directly proportional to a change in the output voltage of the $O_2$ sensor to thereby achieve air/fuel ratio control in a manner more prompt and more efficient than the integral term correction.

As noted above, according to the above I term control, the pulse motor position is varied by an integral value obtained by integrating the value of a binary signal corresponding to the change of the output voltage of the $O_2$ sensor. According to this I term control, the number of steps by which the pulse motor is to be displaced per second differs depending upon the speed at which the engine is then operating. That is, in a low engine rpm range, the number of steps by which the pulse motor is to be displaced is small. With an increase in the engine rpm, the above number of steps increases so that it is large in a high engine rpm range.

Whilst, according to the P term control which, as noted above, is used when there is a change in the output voltage of the $O_2$ sensor from the higher level to the lower one or vice versa with respect to the reference voltage Vref, the number of steps by which the pulse motor is to be displaced per second is set at a single predetermined value (e.g., 6 steps), irrespective of the engine rpm.

The air-fuel ratio control at engine acceleration (i.e., off-idle acceleration) is carried out when the engine rpm Ne exceeds the aforementioned predetermined idle rpm $N_{IDL}$ (e.g., 1,000 rpm) during the course of the engine speed increasing from a low rpm range to a high rpm range, that is, when the engine speed changes from a relationship $Ne < N_{IDL}$ to one $Ne \geq N_{IDL}$. On this occasion, ECU 20 rapidly moves the pulse motor 13 to a predetermined acceleration position (preset position) $PS_{ACC}$, and thereafter initiates the aforementioned air/fuel ratio feedback control. This predetermined position $PS_{ACC}$ is compensated for atmospheric pressure $P_A$, too, as hereinlater described.

The above-mentioned predetermined position $PS_{ACC}$ is set at a position where the amount of detrimental ingredients in the exhaust gases is small. Therefore, particularly at the so-called "standing start", i.e., acceleration from a vehicle-stopping position, setting the pulse motor position to the predetermined position $PS_{ACC}$ is advantageous to anti-exhaust measures, as well as to achievement of accurate air/fuel ratio feedback control to be done following the acceleration. This acceleration control is carried out under a warmed-up engine condition, too. By thus setting the pulse motor to the preset position $PS_{ACC}$ at the standing start of the engine, it is feasible to reduce the amount of detrimental ingredients in the engine exhaust gases to be produced at the standing start. Further, this setting of the pulse motor position automatically determines the initial air/fuel ratio to be applied at the start of air/fuel ratio feedback control immediately following this standing start to thereby facilitate control of the air/fuel ratio to an optimum value for the emission characteristics and driveability of the engine at the start of air/fuel ratio feedback control.

Particularly, the above manner of control at engine acceleration enables a large reduction in the total amount of detrimental ingredients in the exhaust gases to be produced during transition from the standing start to the immediately following air/fuel ratio feedback operation, thus being advantageous to the anti-pollution measures.

In transition from the above-mentioned various open loop control to the closed loop control at engine partial load or vice versa, changeover between open loop mode and closed loop mode is effected in the following manner: First, in changing from closed loop mode to open loop mode, ECU 20 moves the pulse motor 13 to an atmospheric pressure-compensated predetermined position $PSi(P_A)$ in a manner referred to later, irrespective of the position at which the pulse motor was located immediately before entering the open loop control. This predetermined position $PSi(P_A)$ includes preset positions $PS_{CR}$, $PS_{WOT}$, $PS_{IDL}$, $PS_{DEC}$ and $PS_{ACC}$, each of which is corrected in response to actual atmospheric pressure as hereinlater referred to. Various open loop control operations can be promptly done, simply by setting the pulse motor to the above-mentioned respective predetermined positions.

On the other hand, in changing from open loop mode to closed loop mode, ECU 20 commands the pulse motor 13 to initiate air/fuel ratio feedback control with I term correction. That is, there can be a difference in timing between the change of the output signal level of the $O_2$ sensor from the high level to the low level or vice versa and the change from the open loop mode to the closed loop mode. In such an event, the deviation of the pulse motor position from the proper position upon entering the closed loop mode, which is due to such timing difference, is much smaller in the case of initiating air/fuel ratio control with I term correction than that in the case of initiating it with P term correction, to make it possible to resume early accurate air/fuel ratio control and accordingly ensure highly stable engine exhaust emission characteristics.

To obtain optimum exhaust emission characteristics irrespective of changes in the actual atmospheric pressure during open loop air/fuel ratio control or at the time of shifting from open loop mode to closed loop mode, the position of the pulse motor 13 needs to be compensated for atmospheric pressure, as previously mentioned. According to the invention, the above-mentioned predetermined or preset positions $PS_{CR}$, $PS_{WOT}$, $PS_{IDL}$, $PS_{DEC}$, $PS_{ACC}$ at which the pulse motor 13 is to be held during the respective open loop control operations are corrected in a linear manner as a function of changes in the atmospheric pressure $P_A$, using the following equation:

$$PSi(P_A) = PSi + (760 - P_A) \times Ci$$

where i represents any one of CR, WOT, IDL, DEC and ACC, accordingly PSi represents any one of $PS_{CR}$, $PS_{WOT}$, $PS_{IDL}$, $PS_{DEC}$ and $PS_{ACC}$ at 1 atmospheric pressure (=760 mmHg), and Ci a correction coefficient, representing any one of $C_{CR}$, $C_{WOT}$, $C_{IDL}$, $C_{DEC}$ and $C_{ACC}$. The values of PSi and Ci are previously stored in ECU 20.

ECU 20 applies to the above equation the coefficients PSi, Ci which are determined at proper different values according to the kinds of open loop control to be carried out, to calculate by the above equation the position $PSi(P_A)$ for the pulse motor 13 to be set at a required kind of open loop control and moves the pulse motor 13 to the calculated position $PSi(P_A)$, as will be described in detail hereinlater.

By correcting the air/fuel ratio during open loop control in response to the actual atmospheric pressure in the above-mentioned manner, it is possible to obtain not only conventionally known effects such as best driveability and prevention of burning of the ignition plug in an engine cylinder, but also optimum emission characteristics by setting the value of Ci at a suitable value, since the pulse motor position held during open loop control forms an initial position upon entering subsequent closed loop control.

The position of the pulse motor 13 which is used as the actuator for the air/fuel ratio control valve 9 is monitored by a position counter provided within ECU 20. However, there can occur a disagreement between the counted value of the position counter and the actual position of the pulse motor due to skipping or racing of the pulse motor. In such an event, ECU 20 operates on the counted value of the position counter as if it were the actual position of the pulse motor 13. However, this can impede proper setting of the air/fuel ratio during open loop control where the actual position of the pulse motor 13 must be accurately recognized by ECU 20.

In view of the above disadvantage, as previously mentioned, according to the air/fuel ratio control system of the invention, in addition to detection of the initial position of the pulse motor 13 by regarding as the reference position (e.g., 50th step) the position of the pulse motor at which the reed switch 23 turns on or off when the pulse motor is driven, which was previously noted with reference to the initialization, the position counter has its counted value replaced by the number of steps corresponding to the reference position (e.g., 50 steps) stored in ECU 20 upon the pulse motor 13 passing the switching point of the reed switch 23, to thus ensure high reliability of subsequent air/fuel ratio control.

CONTROL OF EXHAUST GAS RECIRCULATION VALVE

As for the exhaust gas recirculation valve (EGR valve) 35, it was previously stated that the above valve 35 is closed to interrupt exhaust gas recirculation at low engine load or at low engine temperature for prevention of incomplete combustion. The condition of interruption of exhaust gas recirculation is met when the absolute pressure $P_B$ in the intake manifold is lower than a predetermined value $P_{BE}$ or when the engine coolant temperature Tw is lower than a predetermined temperature $T_{WE}$. When either the relationship $P_B<P_{BE}$ or $T_W<T_{WE}$ stands, ECU 20 interrupts energization of the solenoid of the control solenoid valve (EGR control valve) 37 to interrupt the operation of the EGR valve 35.

In a conventional exhaust gas recirculation system, there were provided an intake manifold negative pressure sensor having an atmospheric pressure compensating bellows and a temperature sensor, which are independently provided for the respective exclusive purposes of detecting a low load condition of the engine and the temperature of the engine. Whilst in the air/fuel ratio control system of the invention, the pressure sensor 31 and the coolant temperature sensor 33 formed of a thermistor which are used in the arrangement of FIG. 1 for air/fuel ratio control can also directly be used for the control of interruption of exhaust gas recirculation, to thus dispense with provision of special sensors as mentioned above.

Figure 2:
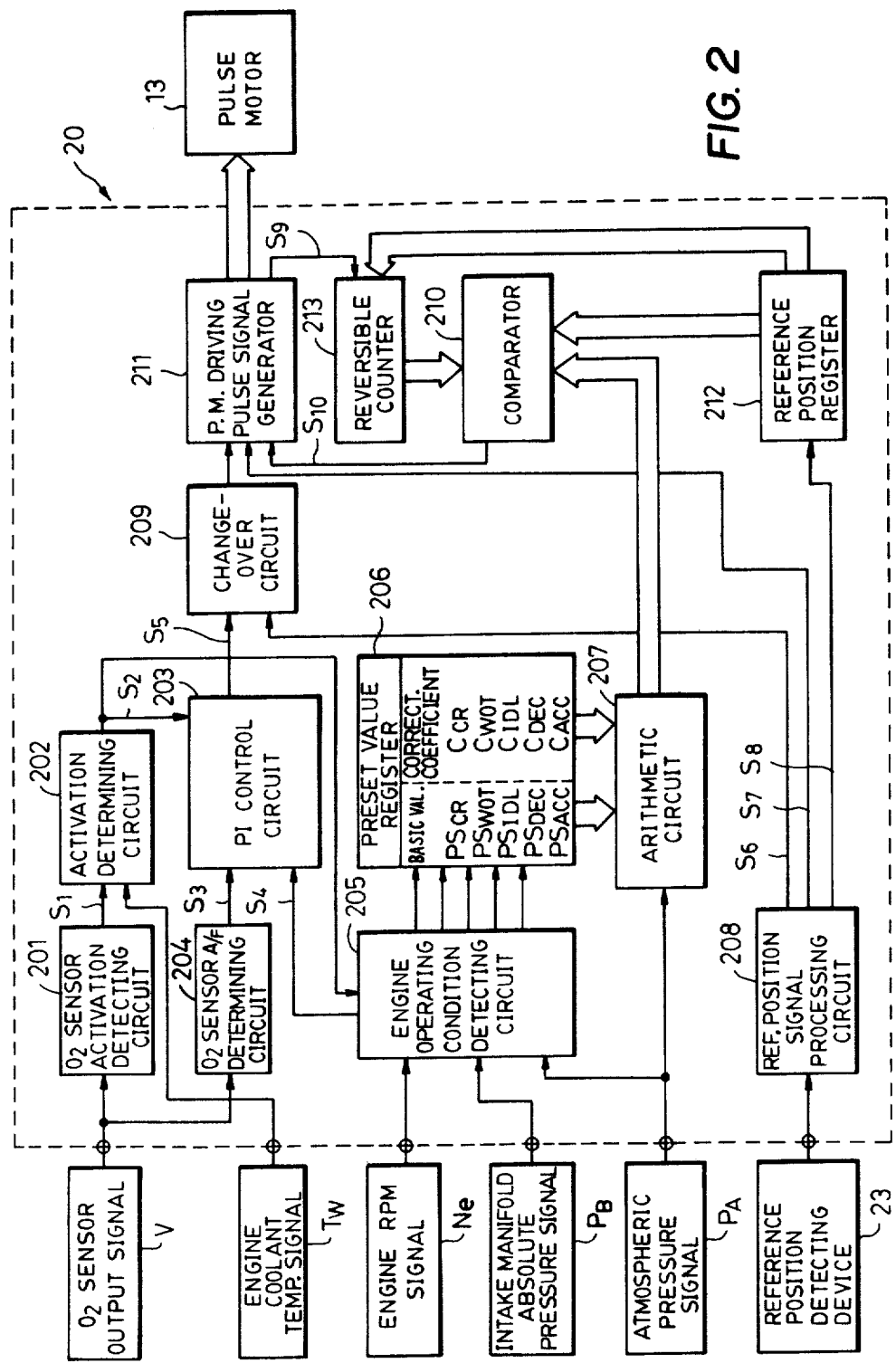
FIG. 2 is a block diagram illustrating the whole arrangement of an electrical circuit provided within the electronic control unit appearing in FIG. 1.

FIG. 2 is a block diagram illustrating the interior construction of ECU 20 used in the air/fuel ratio control system having the above-mentioned functions according to the invention. In ECU 20, reference numeral 201 designates a circuit for detecting the activation of the $O_2$ sensor 28, which is supplied at its input with an output signal V from the $O_2$ sensor. Upon passage of the predetermined period of time $t_x$ after the voltage of the above output signal V has dropped below the predetermined value Vx, the above circuit 201 supplies an activation signal $S_1$ to an activation determining circuit 202. This activation determining circuit 202 is also supplied at its input with an engine coolant temperature signal Tw from the thermistor 33 in FIG. 1. When supplied with both the above activation signal $S_1$ and the coolant temperature signal Tw indicative of a value exceeding the predetermined value Twx, the activation determining circuit 202 supplies an air/fuel ratio control initiation signal $S_2$ to a PI control circuit 203 to render same ready to operate. Reference numeral 204 represents an air/fuel ratio determining circuit which determines the value of air/fuel ratio of engine exhaust gases, depending upon whether or not the output voltage of the $O_2$ sensor is larger than the predetermined value Vref, to supply a binary signal $S_3$ indicative of the value of air/fuel ratio thus obtained, to the PI control circuit 203. On the other hand, an engine operating condition detecting circuit 205 is provided in ECU 20, which is supplied with an engine rpm signal Ne from the engine rpm sensor 39, 40, an absolute pressure signal $P_B$ from the pressure sensor 31, an atmospheric pressure signal $P_A$ from the atmospheric pressure sensor 29, all the sensors being shown in FIG. 1, and the above control initiation signal $S_2$ from the activation determining circuit 202 in FIG. 2, respectively. The circuit 205 supplies a control signal $S_4$ indicative of a value corresponding to the values of the above input signals to the PI control circuit 203. The PI control circuit 203 accordingly supplies to a change-over circuit 209 to be referred to later a pulse motor control signal $S_5$ having a value corresponding to the air/fuel ratio signal $S_3$ from the air/fuel ratio determining circuit 204 and a signal component corresponding to the engine rpm Ne in the control signal $S_4$ supplied from the engine operating condition detecting circuit 205. The engine operating condition detecting circuit 205 also supplies to the PI control circuit 203 the above control signal $S_4$ containing a signal component corresponding to the engine rpm Ne, the absolute pressure $P_B$ in the intake manifold, atmospheric pressure $P_A$ and the value of air/fuel ratio control initiation signal $S_2$. When supplied with the above signal component from the engine operating condition detecting circuit 205, the PI control circuit 203 interrupts its own operation. Upon interruption of the supply of the above signal component to the control circuit 203, a pulse signal $S_5$ is outputted from the circuit 203 to the change-over circuit 209, which signal starts air/fuel ratio control with integral term correction.

On the other hand, a preset value register 206 is provided in ECU 20, in which are stored the basic values of preset values $PS_{CR}$, $PS_{WOT}$, $PS_{IDL}$, $PS_{DEC}$ and $PS_{ACC}$ for the pulse motor position, applicable to various engine conditions, and atmospheric pressure correcting coefficients $C_{CR}$, $C_{WOT}$, $C_{IDL}$, $C_{DEC}$ and $C_{ACC}$ for these basic values. The engine operating condition detecting circuit 205 detects the operating condition of the engine based upon the activation of the $O_2$ sensor and the values of engine rpm Ne, intake manifold absolute pressure $P_B$ and atmospheric pressure $P_A$ to read from the register 206 the basic value of a preset value corresponding to the detected operating condition of the engine and its corresponding correcting coefficient and apply same to an arithmetic circuit 207. The arithmetic circuit 207 performs arithmetic operation responsive to the value of the atmospheric pressure signal $P_A$, using the equation $PSi(P_A) = PSi + (760 - P_A) \times Ci$. The resulting preset value is applied to a comparator 210.

The engine operating condition detecting circuit 205 is also connected to the solenoid 37c of the EGR control valve 37, as mentioned hereinlater.

On the other hand, a reference position signal processing circuit 208 is provided in ECU 20, which is responsive to the output signal of the reference position detecting device (reed switch) 23, indicative of the switching of same, to produce a binary signal $S_6$ having a certain level from the start of the engine until it is detected that the pulse motor reaches the reference position. This binary signal $S_6$ is supplied to the change-over circuit 209 which in turn keeps the control signal $S_5$ from being transmitted from the PI control circuit 203 to a pulse motor driving signal generator 211 as long as it is supplied with this binary signal $S_6$, thus avoiding the interference of the operation of setting the pulse motor to the initial position with the operation of P-term/I-term control. The reference position signal processing circuit 208 also produces a pulse signal $S_7$ in response to the output signal of the reference position detecting device 23, which signal causes the pulse motor 13 to be driven in the step-increasing direction or in the step-decreasing direction so as to detect the reference position of the pulse motor 13. This signal $S_7$ is supplied directly to the pulse motor driving signal generator 211 to cause same to drive the pulse motor 13 until the reference position is detected. The reference position signal processing circuit 208 produces another pulse signal $S_8$ each time the reference position is detected. This pulse signal $S_8$ is supplied to a reference position register 212 in which the value of the reference position (e.g., 50 steps) is stored. This register 212 is responsive to the above signal $S_8$ to apply its stored value to one input terminal of the comparator 210 and to the input of a reversible counter 213. The reversible counter 213 is also supplied with an output pulse signal $S_9$ produced by the pulse motor driving signal generator 211 to count the pulses of the signal $S_9$ corresponding to the actual position of the pulse motor 13. When supplied with the stored value from the reference position register 212, the counter 213 has its counted value replaced by the value of the reference position of the pulse motor.

The counted value thus renewed is applied to the other input terminal of the comparator 210. Since the comparator 210 has its other input terminal supplied with the same pulse motor reference position value, as noted above, no output signal is supplied from the comparator 210 to the pulse motor driving signal generator 211 to thereby hold the pulse motor at the reference position with certainty. Subsequently, when the $O_2$ sensor 28 remains deactivated, an atmospheric pressure-compensated preset value $PS_{CR}(P_A)$ is outputted from the arithmetic circuit 207 to the one input terminal of the comparator 210 which in turn supplies an output signal $S_{10}$ corresponding to the difference between the preset value $PS_{CR}(P_A)$ and a counted value supplied from the reversible counter 213, to the pulse motor driving signal generator 211, to thereby achieve accurate control of the position of the pulse motor 13. Also, when the other open loop control conditions are detected by the engine operating condition detecting circuit 205, similar operation to that just mentioned above are carried out.

Figure 3:
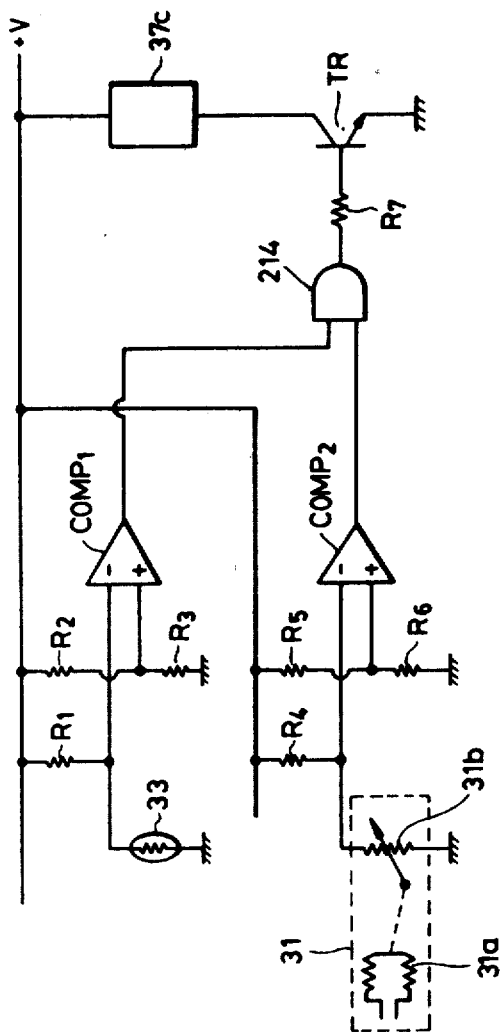
FIG. 3 is a circuit diagram of a control device provided within the circuit of FIG. 2 for controlling the exhaust gas recirculation valve.

Referring to FIG. 3, there is illustrated an electrical circuit which forms part of the engine operating condition detecting circuit 205 in ECU 20 and which is operable at low engine load operation and at low engine temperature operation to close the exhaust gas recirculation valve 35. The thermistor 33 in FIG. 1 is grounded at its one end and connected at its other end by way of a resistance $R_1$ to a positive voltage power source which may be formed of the battery 42 appearing in FIG. 1 and which is adapted to supply a voltage of 12 volts for instance. The above other end of the thermistor 33 is also connected directly to the inverting input terminal of a comparator $COMP_1$. Connected to the non-inverting input terminal of this comparator $COMP_1$ is the junction of a resistance $R_2$ with a resistance $R_3$, the resistances $R_2$, $R_3$ being serially connected between the power source and the ground to provide at their junction a reference voltage corresponding to the predetermined temperature $T_{WE}$. On the other hand, the pressure sensor 31 is formed of a bellows 31a and a potentiometer 31b coupled to the bellows for displacement therewith. The potentiometer 31b has its one end grounded and its other end connected to the positive voltage power source by way of a resistance $R_4$ and also connected directly to the inverting input terminal of a comparator $COMP_2$. Connected to the non-inverting input terminal of the comparator $COMP_2$ is the junction of a resistance $R_5$ with a resistance $R_6$, the resistances $R_5$, $R_6$ being serially connected between the power source and the ground to provide a reference voltage corresponding to the predetermined absolute pressure $P_{BE}$. The comparators $COMP_1$, $COMP_2$ have their respective outputs connected to corresponding input terminals of an AND circuit 214. The AND circuit 214 in turn is connected at its output to the base of an NPN transistor TR by way of a current limiting resistance $R_7$. The transistor TR has its emitter grounded and its collector connected to one end of the solenoid 37c of the EGR control valve 37 in FIG. 1 which has its other end connected to the power source.

With the above arrangement, the thermistor 33, which has a negative temperature coefficient as previously noted, has a high internal resistance value when the engine temperature represented by the engine coolant temperature Tw is low, for instance, at the start of the engine. Therefore, the voltage applied to the inverting input terminal of the comparator $COMP_1$ is higher than the reference voltage determined by the resistances $R_2$, $R_3$ applied to the non-inverting input terminal, so that the comparator $COMP_1$ produces a binary output of 0. Accordingly, the AND circuit 214 produces a binary output of 0, irrespective of the binary output of the other comparator $COMP_2$, keeping the transistor TR in an off state. Therefore, the solenoid 37c of the EGR control valve 37 is in a deenergized state, closing the negative pressure-introducing conduit 36 and simultaneously allowing atmospheric air to be introduced into the negative pressure-actuatable portion of the exhaust gas recirculation valve 35. Thus, the conduit 34 is closed to interrupt the exhaust gas recirculation. Subsequently, when the engine coolant temperature increases so that the terminal voltage of the thermistor 33 applied to the inverting input terminal of the comparator $COMP_1$ drops below the reference voltage applied to the non-inverting input terminal, the comparator $COMP_1$ produces a binary output of 1 to cause the transistor TR to turn on if the output of the other comparator $COMP_2$ is then high. Thus, the solenoid 37c of the EGR control valve 37 is energized to resume the exhaust gas recirculation.

On the other hand, when there occurs a drop in the absolute pressure $P_B$ in the intake manifold 2 at low engine load operation or at engine deceleration, the bellows 31a of the pressure sensor 31 contracts to cause a corresponding increase in the resistance value of the potentiometer 31b. The increased resistance value of the potentiometer 31b causes a corresponding increase in the voltage applied to the inverting input terminal of the comparator $COMP_2$. When the above voltage exceeds the reference voltage applied to the non-inverting input terminal of the comparator $COMP_2$, which is determined by the resistances $R_5$, $R_6$, the binary output of the comparator $COMP_2$ turns low. Consequently, the binary output of the AND circuit 214 turns low, irrespective of the binary output of the comparator $COMP_1$, to deenergize the transistor TR and accordingly deenergize the solenoid 37c to cause interruption of the exhaust gas recirculation. Subsequently, when the engine comes into an accelerated state or a like state so that the absolute pressure $P_B$ in the intake manifold 2 increases, the resistance value of the potentiometer 31b decreases correspondingly to cause energization of the transistor TR if the comparator $COMP_1$ then produces a binary output of 1, so that the solenoid 37c is energized to resume the exhaust gas recirculation.

As set forth above, according to the invention, a pressure sensor and an engine coolant temperature sensor are used for detection of conditions of interruption of the exhaust gas recirculation which is effected by the exhaust gas recirculation system at low engine load operation and at low engine temperature operation, the sensors being simultaneously used to detect various engine operating conditions for execution of the air/fuel ratio control and therefore adapted to produce outputs variable in a continuous manner in response to wide ranges of changes in the absolute pressure in the intake system and the engine temperature. The dual use of the sensors permits simplification of the construction of the control section of the exhaust gas recirculation system, leading to a reduction in the manufacturing cost and easy maintenance of the system.

What is claimed is:

1. An air/fuel ratio control system for performing feedback control of the air/fuel ratio of an air/fuel mixture being supplied to an internal combustion engine having an intake system, an exhaust system and a throttle valve arranged within said intake system, said air/fuel ratio control system comprising in combination: means for detecting the concentration of an exhaust gas ingredient emitted from said engine; fuel quantity adjusting means for producing said mixture being supplied to said engine; and an electrical circuit operatively connecting said concentration detecting means with said fuel quantity adjusting means in a manner effecting feedback control operation to control the air/fuel ratio of said mixture to a predetermined value in response to an output signal produced by said concentration detecting means; an exhaust gas recirculation passage communicating said intake system with said exhaust system; an exhaust gas recirculation valve arranged across said exhaust gas recirculation passage and having means actuatable by negative pressure to open said valve; a port opening in said intake system at a location slightly upstream of said throttle valve in idle position thereof; a negative pressure passage communicating said port with said exhaust gas recirculation valve; a solenoid valve arranged to close said negative pressure passage; an absolute pressure sensor adapted to produce an output signal continuously variable with a change in absolute pressure present in said intake system; an engine temperature sensor adapted to produce an output signal continuously variable with a change in engine coolant temperature; and a circuit provided within said electrical circuit for detecting an operating condition of said engine and electrically connected to said solenoid valve; said electrical circuit being operable on output signals produced by said absolute pressure sensor and said engine temperature sensor to carry out control of the air/fuel ratio of said mixture, said output signals of said absolute pressure sensor and said engine temperature sensors being supplied to said engine operating condition detecting circuit; said electrical circuit being also operable on said output signals of said two last-mentioned sensors to cause said solenoid valve to close said negative pressure passage and simultaneously allow atmospheric air to be introduced into said negative pressure-actuatable means of said exhaust gas recirculation valve when said output signal of said absolute pressure sensor has a value lower than a first predetermined value or when said output signal of said engine temperature sensor has a value lower than a second predetermined value.

2. The air/fuel ratio control system as claimed in claim 1, wherein said electrical circuit includes: a first comparator adapted to produce a high level output when said output signal of said absolute pressure sensor has a value lower than said first predetermined value; a second comparator adapted to produce a high level output when said output signal of said engine temperature has a value lower than said second predetermined value; an AND circuit arranged to be supplied with outputs from said first and second comparators; and a transistor arranged to be supplied with an output from said AND circuit and operable on the same output to drive said solenoid valve.

* * * * *